United States Patent
Bank et al.

(10) Patent No.: US 7,402,933 B1
(45) Date of Patent: Jul. 22, 2008

(54) CONSTANT FORCE MODULAR INTEGRATED INTERNAL BRUSH HOLDER

(75) Inventors: John Bank, Chicago, IL (US); Douglas Bank, Chicago, IL (US); Alex Aguayo, Skokie, IL (US); Kurt Witbeck, Kasota, MN (US)

(73) Assignee: Phoenix Electric Mfg. Co., Chicago, IL (US)

( * ) Notice: Subject to any disclaimer, the term of this patent is extended or adjusted under 35 U.S.C. 154(b) by 0 days.

(21) Appl. No.: 12/020,690

(22) Filed: Jan. 28, 2008

Related U.S. Application Data

(63) Continuation of application No. 11/965,816, filed on Dec. 28, 2007.

(60) Provisional application No. 60/990,812, filed on Nov. 28, 2007, provisional application No. 60/956,256, filed on Aug. 16, 2007.

(51) Int. Cl.
*H02K 13/00* (2006.01)

(52) U.S. Cl. .................. 310/242; 310/239; 310/246

(58) Field of Classification Search ......... 310/238–239, 310/242, 245–246
See application file for complete search history.

(56) References Cited

U.S. PATENT DOCUMENTS

| | | | |
|---|---|---|---|
| 2,383,325 A | 8/1945 | Lessmann | |
| 2,463,097 A | 3/1949 | Gayer | |
| 2,747,117 A | 5/1956 | Litz | |
| 2,763,800 A | 9/1956 | Curley | |
| 2,840,732 A | 6/1958 | Nottelmann et al. | |
| 2,848,633 A | 8/1958 | Atamian | |
| 2,852,628 A | 9/1958 | Fry | |
| 3,158,773 A | 11/1964 | Diehl | |
| 3,271,605 A | 9/1966 | Drabik | |
| 3,430,084 A | 2/1969 | Hall et al. | |
| 3,430,915 A | 3/1969 | Vogelsberg | |
| 3,471,732 A | 10/1969 | Drabik | |
| 3,518,475 A | 6/1970 | Sebok et al. | |
| 3,983,432 A | 9/1976 | Rankin | |
| 4,371,803 A * | 2/1983 | Schindel et al. | 310/242 |
| 4,389,588 A * | 6/1983 | Rankin | 310/242 |
| 4,551,646 A | 11/1985 | Brown | |
| 4,800,313 A * | 1/1989 | Warner et al. | 310/242 |
| 4,990,811 A | 2/1991 | Nakata et al. | |
| 4,994,701 A | 2/1991 | Bulick | |
| 5,237,231 A | 8/1993 | Blaettner et al. | |
| 5,808,393 A * | 9/1998 | Penfold et al. | 310/242 |

* cited by examiner

*Primary Examiner*—Thanh Lam
(74) *Attorney, Agent, or Firm*—Adam K. Sacharoff; Much Shelist

(57) ABSTRACT

In one embodiment of the present invention there is provided a brush holder for use with an electric motor, generator, or actuating device. The brush holder includes a body having an upper portion and a lower portion. A pair of flanges separately extends from opposing sides of the lower portion. Each flange includes a channel to provide a method of adjustably attaching the body to the device. A pair of members separately extends from opposing sides of the upper portion and each member includes a curved surface to accommodate coil ends of a constant force spring. A lateral bore is positioned through the body with openings to the bore being positioned about the pair of members. The bore is sized to accommodate a middle section of a constant force spring. An anterior bore positioned through the body transverses the lateral bore and sized to accommodate a carbon brush.

13 Claims, 4 Drawing Sheets

CONSTANT FORCE MODULAR INTEGRATED INTERNAL BRUSH HOLDER

CROSS REFERENCE TO RELATED APPLICATIONS

The present invention claims priority to 60/956,256 filed Aug. 16, 2007 and claims priority to 60/990,812 filed Nov. 28, 2007.

FIELD OF THE INVENTION

The present invention relates to a brush holder for use with electric motors, generators, and actuating devices.

BACKGROUND OF THE INVENTION

Prior to one or more of the embodiments outlined in the present invention, any type of brush holder utilizing a constant force spring and which was internal to the electric motor, generator, or actuating device (i) consisted of several different complex parts which were fixed in location and position; (ii) was severely limited in range of applicability; (iii) was costly to manufacture; (iv) did not properly receive, position, engage, and actuate the constant force spring; (v) was limited to the utilization of only one spring pressure; (vi) was limited to the utilization of only one size spring; (vii) was limited to only one size, length, or style of carbon brush; and (viii) was not easy to assemble, repair, replace, or maintain.

Since it was very costly to manufacture a brush holder utilizing a constant force spring and which was internal to the electric motor, generator, or actuating device, the range of applicability of such prior art devices was severely limited. One reason for this is due in part because the prior art does not properly receive, position, engage, or actuate the constant force spring so as to optimize its benefits by applying a constant force to the carbon brush. In addition, the prior art does not allow the interchange of different constant force springs of varying pressures and sizes and/or allow different lengths and sizes of carbon brushes. A true constant force was never achieved because the coils of the constant force spring were not properly received, positioned, engaged, and actuated. The prior art typically engaged the coils of a constant force spring by positioning them against a flat planar surface, the result of which was that the contact point was a tangent. Because the point of contact and engagement was a tangent, the constant force spring was not able to consistently achieve its full potential specified pressure nor was it able to achieve a true constant force. The force of the spring would not be constant, but rather, would vary throughout the range of motion, thus negating the well-known advantages of using a constant force spring. This would lead to less than optimal performance, decreased carbon brush life, more frequent and costly replacement of the carbon brushes, and increased maintenance on the electric motor, generator, or actuating device.

SUMMARY OF THE INVENTION

In accordance with the present invention, a brush holder for use with an electric motor, generator or actuating device is provided. One or more of the embodiments outlined in this invention depict a single, unitary, brush holder molded or created from a high temperature, high strength, highly engineered thermoset or thermoplastic plastic resin and which is non-conductive. The brush holder has a unique, symmetrical, opposing, concave curvilinear radii members which properly receive, position, engage, and actuate the coils of a constant force spring so as to optimize the functionality and interchangeability of the constant force spring. The members help to enable a true constant force to be applied throughout the entire range of motion and travel distance of a carbon brush which is positioned and inserted in an anterior opening in the brush holder and engaged by the constant force spring. The constant force spring is thus able to resiliently push the carbon brush against a commutator, slip ring or other rotating conductive surface onto which or from which an electric current is directed or generated. The carbon brush will typically have a copper wire pigtail onto which a lead wire will be affixed. The lead wire in turn will connect to an external electrical source. The single, unitary, modular design of the brush holder can be manufactured without the use of costly, complex configurations and slides in the mold, die and tool set and thus makes it extremely cost-efficient to manufacture. The method of fastening the embodiments in this invention to a mounting surface in the electric motor, generator, or actuating device allows versatility, lends itself to a vast range of applicability and interchangeability in the design and function of the brush holder, electric motor, generator, or actuating device and will allow the longest size brush to be placed in any given internal diameter.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DESCRIPTION OF THE EMBODIMENTS

Figure 1:
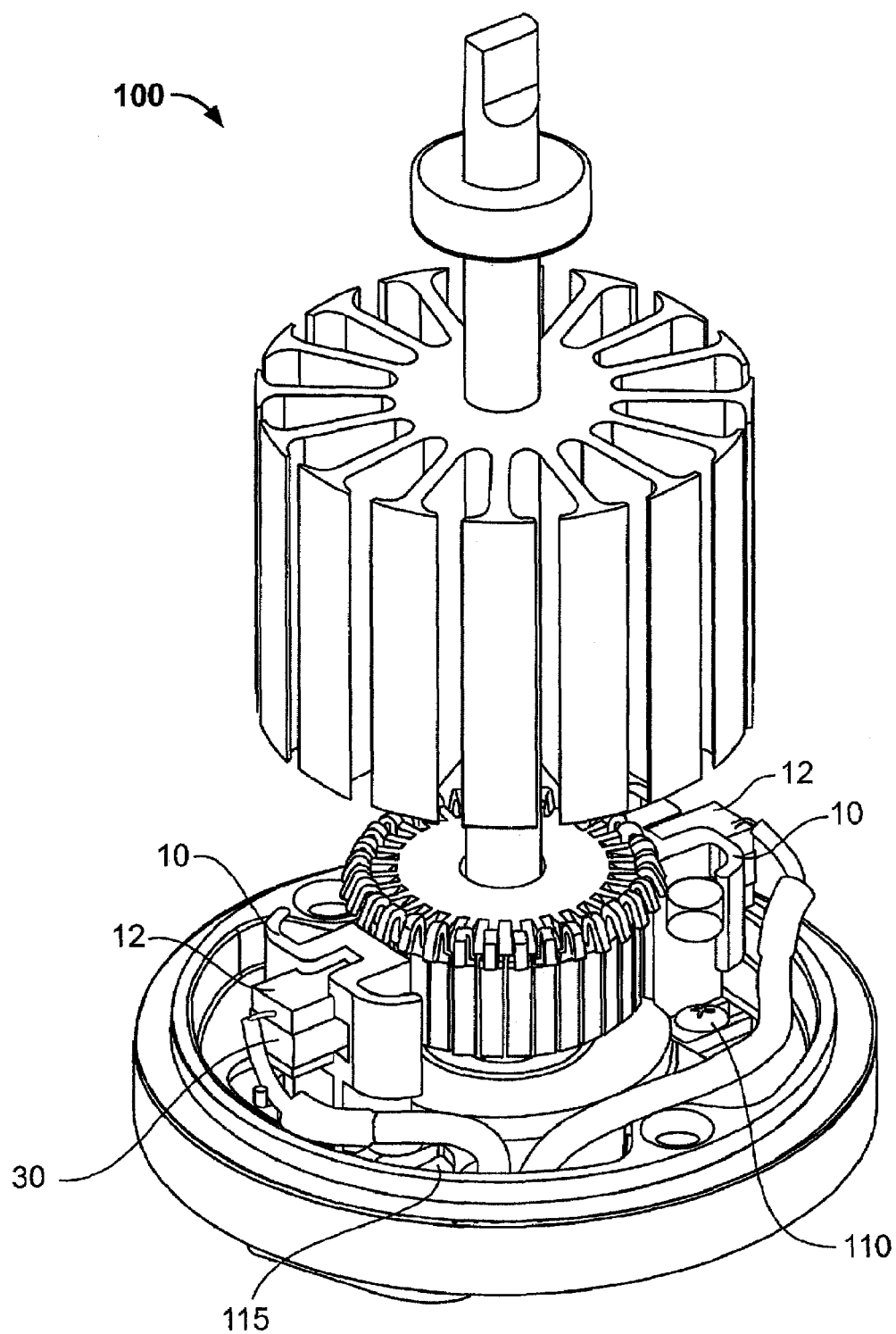
FIG. 1 is a perspective view of an electric motor utilizing one or more of the embodiments outlined in the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims by the embodiments illustrated.

Figure 2A:
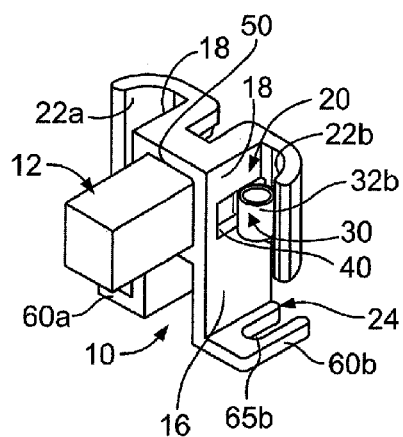
FIGS. 2A through 2D are various views of an embodiment of the present invention illustrating a constant force modular integrated internal brush holder and showing the components of the carbon brush and constant force spring with the brush holder.
Figure 2B:
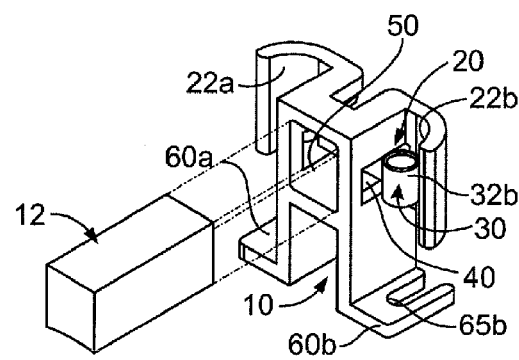
Figure 2C:
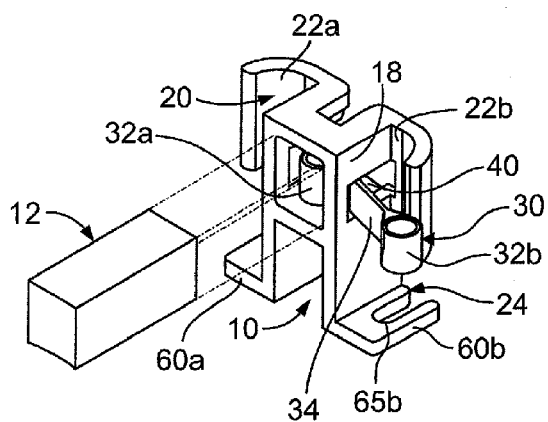
Figure 2D:
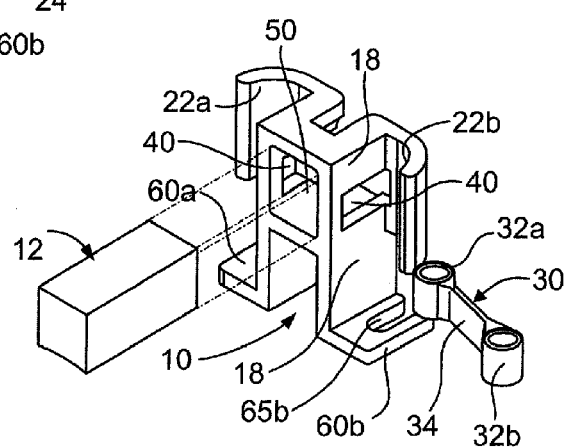
Figure 3A:
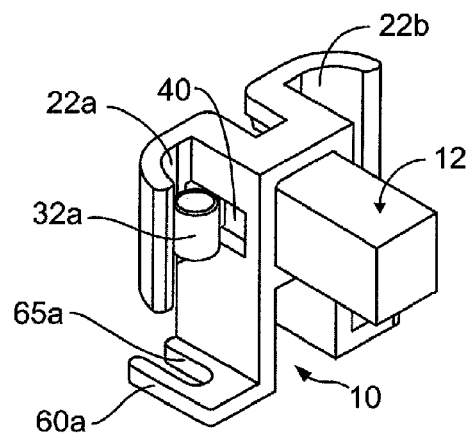
FIGS. 3A through 3D are various views of an embodiment of the present invention illustrating a constant force modular integrated internal brush holder and showing the components of the carbon brush and constant force spring with the brush holder.
Figure 3B:
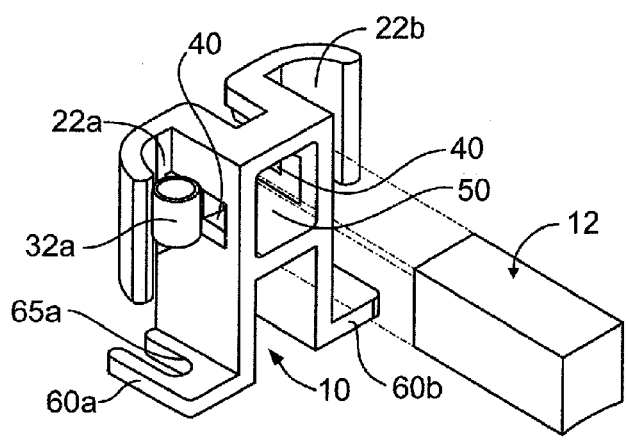
Figure 3C:
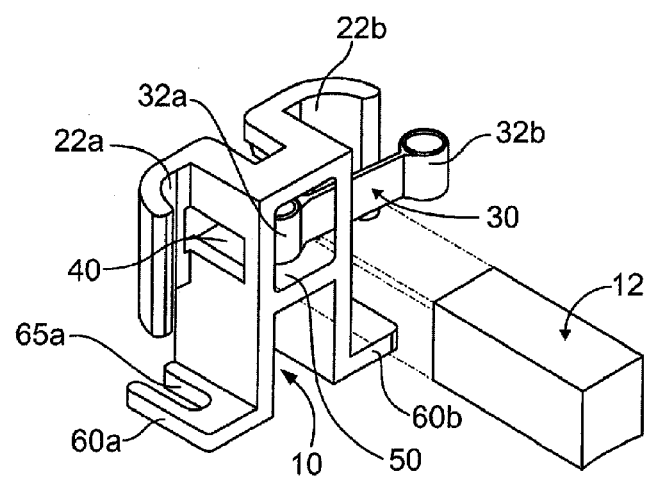
Figure 3D:
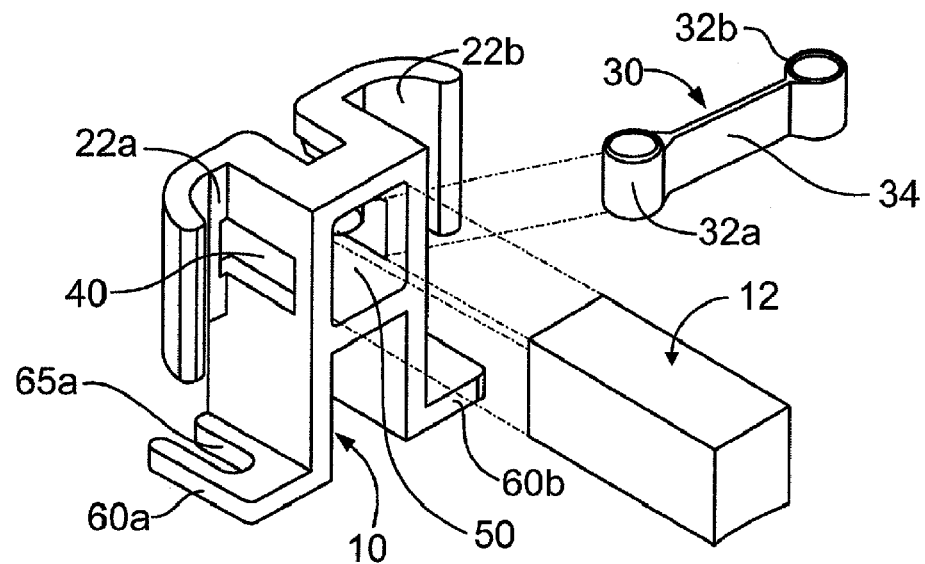
Figure 4:
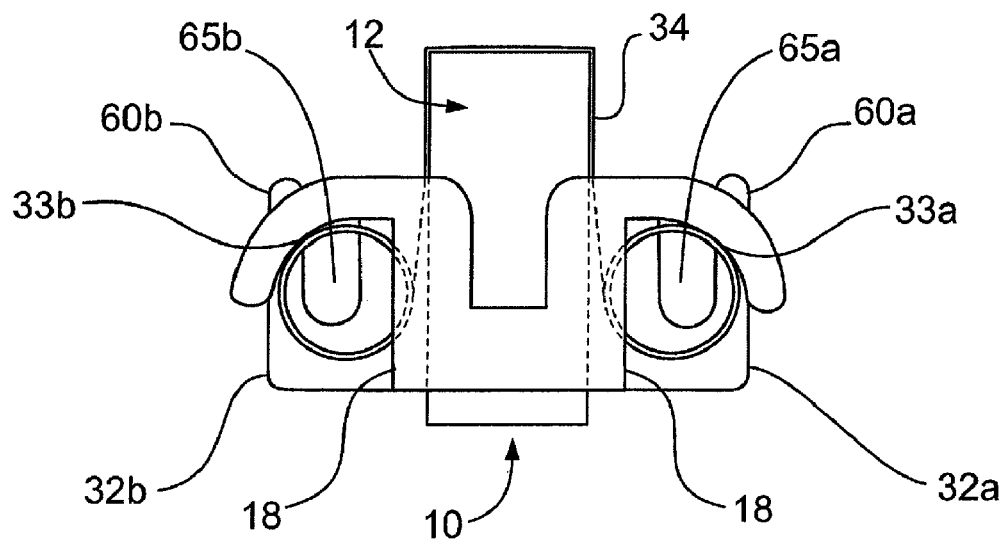
FIG. 4 is a top view of an embodiment of the present invention illustrating a constant force modular integrated internal brush holder and showing the components of the carbon brush and constant force spring with the brush holder.

Referring now to FIGS. 1 through 4 and with particular reference to FIGS. 2A through 4, one or more of the embodiments of the present invention is provided as a constant force modular integrated internal brush holder 10. The brush holder 10 is used to house a carbon brush 12 and a constant force spring assembly 30 as part of a brush-commutated electrical system (illustrated and inserted in an electric motor 100 in FIG. 1). Preferably, the brush holder 10 is a single, unitary molded element of non-conductive, high temperature, high strength, highly engineered thermoset or thermoplastic plastic resin.

The brush holder 10 includes a body 16 that has two sides 18 and an upper portion 20. Extending from the upper portion 20 on each side 18 of the body 16 are two opposing, members 22a, 22b. The members 22a, 22b may be a curved surface to accommodate an outside surface 33a and 33b of the coils 32a, 32b from the constant force spring 30. The members are preferably concave, curvilinear radii members that are symmetrically positioned with respect to one another. The members 22a, 22b are positioned to receive and designed to accommodate the coils 32a, 32b from the constant force spring 30. The brush holder 10 further includes a lateral opening 40 through each side 18 of the body 16. The constant force spring 30 is located and positioned by means of the lateral openings 40 and is secured in place by means of the contact of each of the opposite coils 32a, 32b of the constant force spring 30 as they engage the concave surface of each of the symmetrical curvilinear radii members 22a, 22b. Furthermore, the curvature of the members allow for larger contact area between the members and the coils.

The function of the constant force spring 30 is to uniformly apply a constant force to the carbon brush 12 which is slidably received and inserted in an anterior opening 50 through the brush holder 10. The anterior opening 50 transverses the lateral opening 40 such that the carbon brush 12 is resiliently engaged by a middle portion 34 of constant force spring 30 and forced against a rotating conductive surface onto or from which an electric current is directed or generated, such as a commutator or slip ring.

A lower portion 24 of the brush holder 10 contains two flanges 60a, 60b extending outward from the brush holder 10. The extension is preferably about 90 degrees from an anterior plane of the brush holder 10. Each flange 60a, 60b includes a channel 65a, 65b used to receive a fastener to securely attach the brush holder 10 to a mounting track in an electric motor, generator, or actuating device. The channel 65a, 65b permits the brush holder 10 to be easily positioned at (and moved to or from) various locations on the mounting track in the electric motor, generator, or actuating device housing to accommodate a virtually unlimited variety of carbon brush lengths and sizes. It may be further contemplated that the mounting track would include a width such that the brush holder can be located at various positions along the width.

One or more of the principal advantages and novelty of the embodiments outlined herein for a constant force modular integrated internal brush holder are: (i) the simplicity and multi-functionality of its single, unitary, modular design enable the combination of several separate and distinct parts into one; (ii) its opposing, symmetrical, concave curvilinear radii members which receive the coils of the constant force spring are the optimal surface upon which to receive, engage, position and actuate the constant force spring and optimize the functionality and constant force pressure of the constant force spring; (iii) the design and style of the constant force modular integrated internal brush holder enable it to be manufactured without the necessity of using costly, complex configurations and slides in the mold, die, and tool sets, which significantly reduces cost and increases manufacturability; (iv) the design and style of the constant force modular integrated internal brush holder enable it to accommodate a variety of constant force springs of varying pressures and sizes providing for an interchangeability of spring pressures in a single, unitary, modular brush holder; (v) the design and style of the flanges which enable the constant force modular integrated internal brush holder to be attached to a mounting surface give tremendous flexibility in positioning the constant force modular integrated internal brush holder at a virtually unlimited array of locations for any particular electric motor, generator or actuating device, thus allowing a multitude of lengths, sizes, and styles of carbon brush to be used for any particular diameter of electric motor, generator, or actuating device; and (vi) the simplicity and intuitive design of the constant force modular integrated brush holder allow for ease of assembly, use, and application.

By combining what were previously several separate and distinct parts of an electric motor, generator, or actuating device into a single, unitary, modular design and eliminating redundant and superfluous features and parts, the present invention has achieved an elegant simplicity and multi-functionality. In addition, the design and functionality of the present invention is robust and durable because of its singular design, its structural integrity, and the elimination of redundant parts, which, in the prior art, had to be assembled together, which created fit and tolerancing problems.

The constant force spring housed in the brush holder will permit an even, constant force of applied pressure upon the brush during the life of the brush resulting in a consistent minimal wear rate of the brushes, constant direction of the applied force of the brush, reduced wear of the contact surface, less carbon dust, longer brush life, and lower overall maintenance costs. In addition, the flanges allow for the longest internal brush possible to be utilized in any particular electric motor, generator or actuating device, resulting in the longest possible brush life and electric motor, generator, or actuating device life. The opposing, symmetrical, concave curvilinear radii members that receive, position, engage, and actuate the coils of the constant force spring maximizes the functionality of the constant force spring and the advantages it provides in achieving a substantially true constant force. The symmetrical concave curvilinear radii members also provide the maximum area of surface contact with the coils of the constant force spring, which enables the constant force spring to consistently achieve its full potential specified pressure, as well as actuating a true constant force for the spring throughout the entire range of motion of the spring and the travel distance of the carbon brush, which did not exist in the prior art. The prior art contemplated engaging the coils of a constant force spring tangentially, with a flat planar surface. This dramatically limited the area of surface contact between the coils of the constant force spring and the actuating element. The present invention has overcome this limitation in the prior art by inventing and designing the symmetrical concave curvilinear radial surfaces of the actuating element of the brush holder which provide the maximum amount of surface area contact and engagement with the coils of the constant force spring.

The design and style of one or more of the embodiments of the present invention allow it to be easily, simply and cost effectively manufactured, which will enable the advantages that the constant force modular integrated internal brush holder offers to be expeditiously assimilated into the stream of commerce. The single, unitary, modular design of the brush holder enables it to be manufactured in one shot with a simple, inexpensive die and cavitation set without the necessity of complex configurations, machinery, slides, tools and assembly and secondary operations.

The design and style of one or more of the embodiments of the present invention enable it to accommodate a virtually unlimited variety of constant force springs of varying pressures and sizes. This in turn will allow a virtually unlimited variety of differing sizes and lengths of carbon brush to be utilized in an electric motor, generator, or actuating device. One or more of the embodiments of the present invention offers a highly economical degree of design and application flexibility and interchangeability in constant force springs and carbon brushes which did not previously exist in the prior art. The lateral openings in each side of the body of the brush holder will accommodate many different sizes and pressures of constant force spring and concomitantly allow many different sizes and lengths of carbon brush to be easily used without the necessity of any redesign or retooling. This is novel from the prior art where each particular design was fixed for any particular constant force spring pressure and size (and carbon brush size and length) and any changes could only be effectuated by costly and time-consuming redesigning, retooling, and remanufacturing.

The design and style of the flanges of the brush holder enable tremendous flexibility and interchangeability in positioning the constant force modular integrated internal brush holder inside the electric motor, generator, or actuating device. The design and style of the flanges contemplate utilizing a fastener to attach the brush holder to a matching tracked mounting surface inside the electric motor, generator, or actuating device through the channels. The channels allow the brush holder to be adjusted with respect to the tracked mounting permitting the brush holder to accept a virtually infinite variety of lengths and sizes of carbon brush to be used for any particular diameter of electric motor, generator, or actuating device without the necessity of redesign, retooling and remanufacturing. There are contemplated to be at least two (the actual number will depend on the number of brush holders being utilized) mounting tracks (typically, 180 degrees opposite one another) extending from a point just outside the commutator, slip ring or rotating conductive surface to a point just inside the interior surface of the electric motor, generator, or actuating device housing, which are to be aligned with the flanges and the channels of the brush holder. The brush holder can be located at any point desired along the mounting track, thus allowing for varying lengths and sizes of carbon brush to be utilized for any particular diameter electric motor, generator, or actuating device. This will give engineers incredible latitude in designing electric motors, generators and actuating devices for varying applications and will allow the longest sized carbon brush to be located in any given internal electric motor, generator, or actuating device, thus enabling much longer brush life. This is extremely important because of the criticality of long brush life to electric motor, generator, or actuating device attractiveness, longevity, and performance. This tremendous interchangeability and flexibility in design and performance is novel and did not exist in the prior art. In the prior art, each particular brush holder location was fixed and to change the brush holder location entailed costly and time-consuming redesign, retooling and remanufacturing.

The novel intuitive and elegant simplicity of the design and functionality of the constant force modular integrated internal brush holder enable it to be easily assembled, used, and applied in manufacturing and in the stream of commerce. The facility of inserting the constant force spring assembly into the lateral opening in the body of the brush holder, pushing the carbon brush through the anterior opening of the brush holder and then fastening the brush holder to a mounting surface via the channels makes the entire assembly operation (in addition to subsequent repair, replacement and maintenance of the brush holder and the carbon brush) quicker, more efficient, more cost effective, and less troublesome and cumbersome than the designs contemplated by the prior art.

In one embodiment of the present invention there is provided a brush holder system for use with an electric motor, generator, or actuating device. The brush holder includes a constant force spring having a pair of coils positioned on either end of a middle section, carbon brush, and a brush holder. The brush holder is designed to have a body with opposing sides, an upper portion, and a lower portion. The lower portion has a pair of flanges separately extending from opposing sides of the body. Each flange includes a channel to provide a means to secure the body to the electric motor, generator, or actuating device. The upper portion has a pair of members separately extending from opposing sides of the body. The members have a curved surface to accommodate the coils of the spring. The body further includes a lateral bore positioned through the body such that the openings of the bore are positioned about the pair of members. The lateral bore is sized to accommodate the middle section of the spring. In addition, an anterior bore is positioned through the body to transverse the lateral bore and is sized to accommodate the carbon brush such that one end of the carbon brush is positioned against the middle section of the spring. When the brush holder is secured to the electric motor, generator, or actuating device, the middle portion of the spring will engage one end of the carbon brush and resiliently push the brush against a rotating conductive surface of the device with a constant force.

In another embodiment of the present invention there is provided a brush holder for use with an electric motor, generator, or actuating device. In this embodiment the brush holder includes a body having opposing sides, an upper portion, and a lower portion. A pair of flanges separately extends from opposing sides of the lower portion. Each flange includes a channel to provide a means to secure the body to the electric actuating device. A pair of members separately extends from opposing sides of the upper portion of the body. The members have a curved surface to accommodate coil ends of a constant force spring. A lateral bore is positioned through the body with openings to the bore positioned about the pair of members. The lateral bore is sized to accommodate a middle section of a constant force spring that is defined between the coil ends. In addition, an anterior bore is positioned through the body, which transverses the lateral bore and is sized to accommodate a carbon brush.

In this embodiment, the electric motor, generator, or actuating device may include a mounting track for receiving the flanges. The mounting track may also have a width such that the brush holder can be adjusted along the width.

In yet another embodiment of the present invention, a brush holder for use with an electric motor, generator, or actuating device may be provided to include a body having opposing sides and an upper portion. A means for securing the body to the electric motor, generator, or actuating device would also be provided. A pair of members separately extending from opposing sides of the upper portion would further include a curved surface to accommodate coil ends of a constant force spring. A lateral bore is positioned through the body with openings positioned about the pair of members. The lateral bore is sized to accommodate a middle section of a constant force spring defined between the coil ends of the constant force spring. In addition, an anterior bore is positioned through the body to transverse the lateral bore and is sized to accommodate a carbon brush.

In this embodiment the means for securing the body to the electric motor, generator, or actuating device may further include a pair of flanges separate extending from opposing sides of a lower portion of the body. Each flange includes a channel to provide a means to adjustably attach the body to the electric motor, generator, or actuating device. In addition, the electric motor, generator, or actuating device may include a mounting track for receiving the flanges and include openings to receive a fastener that is positioned through each channel of the flanges and into the openings. The mounting track may include a width wider than the flanges such that the brush holder can be located at various positions along the width of the mounting track.

In one or more of the embodiments, the body may also be made from a thermoset or thermoplastic plastic resin. Similarly, the members may be symmetrical curvilinear radii members.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is intended to cover by the appended claims all such modifications as fall within the scope of the claims.

We claim:

1. A brush holder system for use with an electric motor, generator, or actuating device, the system comprising:
   a constant force spring having a pair of coils positioned on either end of a middle section;
   a carbon brush; and
   a brush holder having a body defined with opposing sides, an upper portion and a lower portion, the lower portion having a pair of flanges separately extending from opposing sides of the body, each flange includes a channel to receive a fastener to secure the body to the electric motor, generator, or actuating device, the upper portion having a pair of members separately extending from opposing sides of the body, the members having a curved surface to accommodate an outside surface of the coils of the spring, the body further includes a lateral bore positioned through the body such that openings of the bore are positioned about the pair of members, the lateral bore sized to accommodate the middle section of the spring, and an anterior bore positioned through the body, the anterior bore being positioned to transverse the lateral bore and sized to accommodate the carbon brush such that one end of the carbon brush is positioned against the middle section of the spring, and
   wherein when the brush holder is secured to the electric motor, generator, or actuating device, the middle portion of the spring engages said one end of the carbon brush and resiliently pushes said brush against a rotating conductive surface of the electric motor, generator, or actuating device with a constant force.

2. The system of claim 1, wherein the body is made from a nonconductive material, such as but not limited to a thermoset or thermoplastic plastic resin.

3. The system of claim 2, wherein the members are further symmetrical curvilinear radii members.

4. A brush holder for use with an electric motor, generator, or actuating device comprising:
   a body having opposing sides, an upper portion and a lower portion;
   a pair of flanges separately extending from opposing sides of the lower portion of the body, each flange includes a channel to adjustably attach via a fastener the body to the electric motor, generator, or actuating device;
   a pair of members separately extending from opposing sides of the upper portion of the body, the members having a concaved surface to accommodate an outside surface of coil ends of a constant force spring;
   a lateral bore positioned through the body such that openings of the bore are positioned about the pair of members, the lateral bore sized to receive a middle section of a constant force spring defined between the coil ends of the constant force spring; and
   an anterior bore positioned through the body, the anterior bore being positioned to transverse the lateral bore and sized to accommodate a carbon brush.

5. The brush holder of claim 4, wherein the body is made from a nonconductive material, such as but not limited to a thermoset or thermoplastic plastic resin.

6. The brush holder of claim 4, wherein the members are further symmetrical curvilinear radii members.

7. The brush holder of claim 5, wherein the electric motor, generator, or actuating device includes a mounting track for receiving the flanges and the mounting track having a width such that the brush holder can be located at various positions along the width.

8. A brush holder for use with an electric motor, generator, or actuating device comprising:
   a body having opposing sides and an upper portion;
   a pair of members separately extending from opposing sides of the upper portion of the body, the members having a curved surface to accommodate coil ends of a constant force spring;
   a lateral bore positioned through the body such that openings of the bore are positioned about the pair of members, the lateral bore sized to accommodate a middle section of a constant force spring defined between the coil ends of the constant force spring; and
   an anterior bore positioned through the body, the anterior bore being positioned to transverse the lateral bore and sized to accommodate a carbon brush.

9. The brush holder of claim 8, further comprising a pair of flanges separately extending from opposing sides of a lower portion of the body, each flange includes a channel to adjustably attach the body to the electric motor, generator, or actuating device with a fastener.

10. The brush holder of claim 9, wherein the electric motor, generator, or actuating device includes a mounting track for receiving the flanges and openings to receive a fastener through each channel of the flanges and into the openings.

11. The brush holder of claim 10, wherein the mounting track has a width wider than the flanges such that the brush holder can be located at various positions along the width of the mounting track.

12. The brush holder of claim 8, wherein the body is made from a nonconductive material, such as but not limited to a thermoset or thermoplastic plastic resin.

13. The brush holder of claim 8, wherein the members are further symmetrical concaved curvilinear radii members.

* * * * *